Patented Aug. 15, 1950

2,518,496

UNITED STATES PATENT OFFICE 2,518,496

REACTION PRODUCTS OF ROSIN ESTERS AND PROCESS OF PREPARING SAME

John B. Rust, Montclair, N. J., assignor, by direct and mesne assignments, of one-half to Montclair Research Corporation, a corporation of New Jersey, and one-half to Ellis-Foster Company, a corporation of New Jersey No Drawing. Application March 15, 1946, Serial No. 654,797

12 Claims. (Cl. 260—26)

1

The present invention relates to modified rosin esters which are particularly adapted for use in coating compositions. In particular it relates to reaction products of rosin-polyhydric alcohol esters with a neutral liquid polymerizable ester comprising the esterification product of a polyhydric alcohol with a monoester of a dicarboxylic acid and a beta-unsaturated monohydric alcohol of from 3 to 4 carbon atoms.

It is an object of this invention to provide modified rosin esters which are hard and tough and compatible with nitrocellulose.

It is an object of this invention to provide modified rosin esters which are soluble in drying oils and which may be made heat convertible on proper formulation.

It is a further object to provide modified natural resin esters which accelerate the bodying of drying oils.

Another object of this invention is to make high-melting, tough, pale-colored modified rosin esters useful as components in varnishes.

Another object of the invention is to make substantially neutral, heat-hardenable derivatives of rosin esters.

Still further objects and advantages of the present invention will be apparent from the more detailed description set forth below, it being understood that this more detailed description is given by way of illustration and explanation only and not by way of limitation, since various changes therein may be made by those skilled in the art without departing from the scope and spirit of the invention.

The process of the present invention comprises reacting rosin esters, such as those consisting essentially of glyceryl abietate, pentaerythrityl abietate, mannityl abietate, glycol abietate, and the like, with an unsaturated polymerizable liquid ester prepared from a polyhydric alcohol and a monoalkenyl ester containing fully esterified polyhydric alcohol hydroxyl groups of a dicarboxylic acid such as the polyhydric alcohol ester of monoallyl maleate, monoallyl fumarate, monoallyl itaconate, monoallyl citraconate, monoallyl phthalate, monoallyl succinate, monoallyl sebacate, monoallyl adipate, monoallyl hydrophthalate and the like. The dicarboxylic acids may be aliphatic or aromatic and saturated or unsaturated. The unsaturated dicarboxylic acids include, besides alpha-beta unsaturated acids shown above, also gamma-unsaturated, alpha-beta-dicarboxylic acids such as adducts of alpha-beta unsaturated acids with conjugated diolefins; for example, butadiene-maleic and cyclopenta-

2 diene-maleic adducts, a suitable monoester of the latter being the monoallyl ester thereof. Other beta-unsaturated monohydric alcohols may be used in place of allyl alcohol such as methallyl alcohol, crotyl alcohol, propargyl alcohol, butenyl alcohol, and the like. Among the polyhydric alcohols most suitable for esterification with the monoalkenyl ester of a dicarboxylic acid are diethylene glycol, ethylene glycol, glycerol, pentaerythritol, sorbitol, mannitol, dihydroxyethoxy benzene and the like. The rosin ester is one which still contains the characteristic unsaturation of abietic acid or rosin acids. Mixed esters can be used also such as rosin phthalic glyceride.

I have found that it is possible to co-react the rosin ester and the unsaturated polymerizable ester (prepared from a polyhydric alcohol and a monoalkenyl ester of a dicarboxylic acid) at a relatively low temperature of about 200–220° C. until a preliminary reaction is over. This preliminary reaction appears to be in the form of a partial reaction of the unsaturated polymerizable ester with the rosin ester, there being formed a clear, relatively low-melting product. As heating is continued to 250° C. copolymerization takes place and there is formed a very high-melting light-colored resin. This statement of theory is by way of illustration, and therefore is not to be considered as being limiting. Although the above procedure is satisfactory and permits a careful control in the process of the present invention, the ingredients may be mixed and heated directly to 250–300° C. Up to a temperature of 200° C. a cold bead of the resin is cloudy, the transformation into a clear resin being secured after the preliminary reaction has taken place. If heating is above about 300° C. decomposition is favored.

I may use small amounts of the unsaturated polymerizable ester to modify the resin esters such as 1%, or I may use more such as 20% or more. When I use, say 30% or more, insoluble, infusible resins are secured. Using say 10% of an ester prepared from diethylene glycol and monoallyl maleate with ester gum, a hard resin is secured having excellent properties in varnishes and lacquers. When using say 30% of the ester prepared from diethylene glycol and monoallyl maleate with ester gum and heating at 250° C. for a short time, a gelled resin results which is insoluble, or only slightly soluble in solvents but which may be swollen to some extent depending upon the amount of combined polymerizable ester. The greater the amount of polymerizable ester, the harder are the resins and the less swollen are the gelled materials.

I have also found that it is possible to copolymerize the product of the present invention with such polymerizable compounds as styrene, methyl methacrylate, vinyl acetate, ethyl acrylate, indene, and the like. I may first carry out a preliminary reaction between, for example, ester gum and the polymerizable ester prepared from diethyl glycol and monoallyl maleate and then copolymerize with, say, styrene. Such copolymer resins are very useful in making varnishes with drying oils, and making lacquers with nitrocellulose or other cellulose derivative.

In another embodiment of the present invention, in place of ester gum, pentaerythritol tetraabietate, and the like, I may for example employ a partially saponified or completely saponified natural resin or gum, thus securing the resin acids and re-esterifying them with sufficient polyhydric alcohol such as diethylene glycol, glycerol, pentaerythritol, sorbitol and the like, to form natural resin esters. Among the more desirable natural gums or resins which may be employed in this particular embodiment are damar, Manila copal, thus gum, congo copal, gum elemi, sandarac. In particular applications it may also be desirable to employ a mixed ester prepared from rosin and the resin acids of saponified or partially saponified gums and shellac. These particular type esters may then be reacted with the unsaturated polymerizable ester following the procedure heretofore disclosed for ester gum.

The resins of the present invention are preferably made without polymerization catalysts. However, the use of catalysts speeds up the initial polymerization if it is desired to effect such reaction and also accelerates the final polymerization.

The modified resins of the present invention may be put to a variety of uses, as for example in formulations of lacquers with nitrocellulose, varnishes with drying oils, etc. It is a particular object of this invention to produce oil-reactive heat-advancing resins by reacting the rosin esters or modified rosin esters with the unsaturated polymerizable ester, capable of continued polymerization when they are heated with drying oils in the usual practice of making varnishes. The resins of the present invention may be also blended with other resins such as phenol-aldehyde resins, urea-formaldehyde resins, melamine-formaldehyde, vinyl resins, methyl methacrylate resins, acrylate resins, cellulose derivatives and the like.

The following examples are given and all proportions are in parts by weight.

*Example 1.*—90 parts of glyceryl triabietate (ester gum) are heated to 150° C. and 10 parts of the diethylene glycol ester of monoallyl maleate added. Heating is continued rapidly to 200° C. and held at 200–220° C. for one hour; the resulting resin is clear when cold. The temperature is increased to 250° C. and held there for 3 hours to harden the resin. A light-colored product is obtained which possesses an acid number of 9.1 and a ring and ball softening point of 112° C. The resulting resin is soluble in ketones, hydrocarbons, and such esters as butyl acetate, amyl acetate, and the like.

*Example 2.*—160 parts of the glyceryl triabietate (ester gum) are heated to 150° C. and 40 parts of the diethylene glycol ester of monoallyl maleate added. Heating is continued to 250° C. and the temperature held at 240–250° C. for 4½ hours. A light-colored exceedingly hard resin is formed which possesses an acid number of 10.4 and a ring and ball softening point of 119° C.

30 parts of the above resin and 60 parts of bodied linseed oil are heated together rapidly to 300° C. and held at 290°–300° C. for 12 minutes. The resulting varnish base is light-colored and may be drawn into a string 18″–24″ in length. It is thinned with 90 parts of V. M. and P. naphtha, and 0.6% lead as lead naphthenate and 0.06% cobalt as cobalt naphthenate are added as driers based upon the oil. The resulting varnish air-dried to a tack-free film in 6 hours. After 24 hours an air-dried film possessed a Sward rocker hardness of 53 and after 48 hours a hardness of 61. A film of the varnish air-dried for 48 hours did not cloud in tap water during 48 hours.

*Example 3.*—70 parts of glyceryl triabietate (ester gum) are heated to 150° C. and 30 parts of the diethylene glycol ester of monoallyl maleate added. Heating is continued rapidly to 250° C. and the temperature held at 240–250° C. for 2¾ hours whereupon the entire mass became infusible. The product was insoluble but swelled somewhat in butyl acetate and also in toluol.

*Example 4.*—70 parts of glycerol triabietate (ester gum) are heated to 150° C. and 30 parts of the diethylene glycol ester of monoallyl maleate added. Heating is continued rapidly to 250° C. and the temperature held at 240–250° C for ¼ hour; a hard, clear resin is produced. The product is soluble in such solvents as hydrocarbons and acetates. It possessed an acid number of 11.9 and a ring and ball softening point of 109° C.

*Example 5.*—80 parts of glyceryl triabietate (ester gum) are heated to 150° C. and 20 parts of the diethylene glycol ester of the monoallyl ester of cyclopentadiene-maleic adduct added. Heating is continued rapidly to 250° C. and the temperature maintained at 240–250° C. for 5½ hours. A clear, light-colored resin is secured which possesses an acid number of 10.8 and a ring and ball softening point of 114° C.

30 parts of the above resin and 60 parts of bodied linseed oil are heated together rapidly to 300° C. and held at 290–300° C. for 16 minutes. The resulting varnish base is light-colored and may be drawn into a string 18″–24″ in length. It is thinned with 90 parts of V. M. and P. naphtha, and 0.6% lead as lead naphthenate and 0.06% cobalt as cobalt naphthenate added as driers based upon the oil. The resulting varnish air-dried to a tack-free film in 6½ hours. After 48 hours the air-dried film possessed a Sward rocker hardness of 67. A film of the varnish air-dried for 48 hours did not cloud in tap water during 24 hours.

*Example 6.*—90 parts of pentaerythrityl tetraabietate (Pentalyn G) are heated to 150° C. and 10 parts of the glycerol ester of monoallyl phthalate added. Heating is continued rapidly to 240° C. and held at 230–240° C. for 3¼ hours to form a clear, hard resin. The resulting resin possessed an acid number of 17.3 and a ring and ball softening point of 106° C.

*Example 7.*—95 parts of pentaerythrityl tetraabietate (Pentalyn G) are heated to 150° C. and 5 parts of glycerol ester of monoallyl maleate added. Heating is continued rapidly to 240° C. and held at 240–260° C. for 5¾ hours to secure a clear, hard resin. The resulting resin possessed an acid number of 13.1 and a ring and ball softening point of 112° C.

*Example 8.*—85 parts of glyceryl triabietate (ester gum) are heated to 150° C. and 15 parts of the glycerol ester of monoallyl maleate added. Heating is continued rapidly to 200° C. and the temperature held at 200-210° C. for an additional 6 hours, a light-colored hard resin being obtained. The resin possessed an acid number of 9.8 and a ring and ball softening point of 115° C.

Example 9.—95 parts of glyceryl triabietate (ester gum) are heated to 150° C. and 5 parts of the pentaerythritol ester of monoallyl maleate added. Heating is continued rapidly to 200° C. and the temperature held at 200-210° C. for 4 hours. A light-colored resin is secured which possesses an acid number of 10.7 and a ring and ball softening point of 108° C.

30 parts of the above resin and 60 parts of bodied linseed oil are heated together to 300° C. and held at this temperature for 20 minutes. The resulting varnish base is thinned with 90 parts of V. M. and P. naphtha to which is added 0.6% lead as lead naphthenate and 0.06% cobalt as cobalt naphthenate as driers based upon the oil. The resulting varnish air-dried to a tack-free film in 7½ hours and after drying for 48 hours possessed a Sward rocker hardness of 63. A film of the varnish air-dried for 48 hours did not cloud in tap water during 48 hours.

Having thus set forth my invention, I claim:

1. A resinous composition comprising the reaction product at between 200° C. and 300° C. of (a) a rosin-polyhydric alcohol ester with (b) from 1% to 30% of the esterification product of a polyhydric alcohol with a monoester of a dicarboxylic acid and a beta-unsaturated monohydric alcohol having from 3 to 4 carbon atoms, all hydroxyl groups in the reaction product being esterified.

2. The composition of claim 1 wherein the rosin-polyhydric alcohol ester is glyceryl triabietate all hydroxyl groups in the reaction product being esterified.

3. The composition of claim 1 wherein the rosin-polyhydric alcohol ester is pentaerythrityl tetraabietate all hydroxyl groups in the reaction product being esterified.

4. A resinous composition comprising the reaction product at between 200° C. and 300° C. of (a) a rosin-polyhydric alcohol ester with (b) from 1% to 30% of the esterification product of a polyhydric alcohol with a monoester of an alpha-olefinic alpha-beta dicarboxylic acid and a beta-unsaturated monohydric alcohol having from 3 to 4 carbon atoms all hydroxyl groups in the reaction product being esterified.

5. A resinous composition comprising the reaction product at between 200° C. and 300° C. of (a) a rosin-polyhydric alcohol ester with (b) from 1% to 30% of the esterification product of a polyhydric alcohol with a monoester of a gamma-olefinic alpha-beta dicarboxylic acid and a beta-unsaturated monohydric alcohol having from 3 to 4 carbon atoms all hydroxyl groups in the reaction product being esterified.

6. A resinous composition comprising the reaction product at between 200° C. and 300° C. of (a) a rosin-polyhydric alcohol ester with (b) from 1% to 30% of the esterification product of diethylene glycol with a monoester of a dicarboxylic acid and a beta-unsaturated monohydric alcohol having from 3 to 4 carbon atoms all hydroxyl groups in the reaction product being esterified.

7. A resinous composition comprising the reaction product at between 200° C. and 300° C. of (a) a rosin-polyhydric alcohol ester with (b) from 1% to 30% of the esterification product of glycerol with a monoester of a dicarboxylic acid and a beta-unsaturated monohydric alcohol having from 3 to 4 carbon atoms all hydroxyl groups in the reaction product being esterified.

8. A resinous composition comprising the reaction product at between 200° C. and 300° C. of (a) a rosin-polyhydric alcohol ester with (b) from 1% to 30% of the esterification product of pentaerythritol with a monoester of a dicarboxylic acid and a beta-unsaturated monohydric alcohol having from 3 to 4 carbon atoms all hydroxyl groups in the reaction product being esterified.

9. A resinous composition comprising the reaction product at between 200° C. and 300° C. of a rosin-polyhydric alcohol ester with from 1% to 30% of the diethylene glycol ester of monoallyl maleate all hydroxyl groups in the reaction product being esterified.

10. A resinous composition comprising the reaction product at between 200° C. and 300° C. of a rosin-polyhydric alcohol ester with from 1% to 30% of the diethylene glycol ester of the monoallyl ester of cyclopentadiene-maleic adduct all hydroxyl groups in the reaction product being esterified.

11. A resinous composition comprising the reaction product at between 200° C. and 300° C. of a rosin-polyhydric alcohol ester with from 1% to 30% of the glycerol ester of monoallyl maleate all hydroxyl groups in the reaction product being esterified.

12. The process of making a resinous composition which comprises heating at between 200° C. and 300° C.: (a) a rosin-polyhydric alcohol ester and (b) from 1% to 30% of the esterification product of a polyhydric alcohol with a monoester of a dicarboxylic acid and a beta-unsaturated monohydric alcohol having from 3 to 4 carbon atoms all hydroxyl groups in the reaction product being esterified.

JOHN B. RUST.

REFERENCES CITED

The following references are of record in the file of this patent:

UNITED STATES PATENTS

| Number | Name | Date |
| --- | --- | --- |
| 2,280,242 | Kropa | Apr. 21, 1942 |
| 2,379,251 | Muskat | June 26, 1945 |
| 2,398,668 | Rust | Apr. 16, 1946 |
| 2,398,669 | Rust | Apr. 16, 1946 |